(12) United States Patent
Zhou et al.

(10) Patent No.: US 11,483,755 B2
(45) Date of Patent: Oct. 25, 2022

(54) CONFIGURATION INFORMATION TRANSMISSION METHOD, CU AND DU, AND COMPUTER STORAGE MEDIUM

(71) Applicant: DATANG MOBILE COMMUNICATIONS EQUIPMENT CO., LTD., Beijing (CN)

(72) Inventors: Ye Zhou, Beijing (CN); Meng Xu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 95 days.

(21) Appl. No.: 17/261,180

(22) PCT Filed: Jun. 4, 2019

(86) PCT No.: PCT/CN2019/089918
§ 371 (c)(1),
(2) Date: Jan. 19, 2021

(87) PCT Pub. No.: WO2020/024697
PCT Pub. Date: Feb. 6, 2020

(65) Prior Publication Data
US 2021/0274417 A1     Sep. 2, 2021

(30) Foreign Application Priority Data
Aug. 2, 2018   (CN) .......................... 201810873093.7

(51) Int. Cl.
*H04W 36/38* (2009.01)
*H04W 76/27* (2018.01)
(Continued)

(52) U.S. Cl.
CPC .......... *H04W 36/38* (2013.01); *H04W 36/08* (2013.01); *H04W 48/12* (2013.01);
(Continued)

(58) Field of Classification Search
CPC ..... H04W 36/38; H04W 36/08; H04W 48/12; H04W 68/005; H04W 74/002; H04W 76/27
See application file for complete search history.

(56) References Cited

U.S. PATENT DOCUMENTS

2018/0026740 A1    1/2018  Chen et al.
2020/0367196 A1*  11/2020  Chen ..................... H04L 5/0053

FOREIGN PATENT DOCUMENTS

CN          107613566 A       1/2018

OTHER PUBLICATIONS

Ericsson et al.,"Ingbert Sigovich, ETSI/MCC Project manager", 3GPP TSG WG RAN3 Meeting #97bis, Prague, Czech Republic, Oct. 9-13, 2017, total 234 pages, R3-174261.
(Continued)

*Primary Examiner* — Nam T Huynh
(74) *Attorney, Agent, or Firm* — Kilpatrick Townsend & Stockton, LLP

(57) ABSTRACT

Disclosed are a configuration information transmission method, a central unit (CU) and a distributed unit (DU), and a computer storage medium, for use in reducing system overheads. The configuration information transmission method: includes a CU of a radio access network (RAN) receives a first interface message from a DU of the RAN, wherein the first interface message carries first indication information, the first indication information is used for indicating at least one terminal device, and a bandwidth part (BWP) currently activated by the at least one terminal device is not configured with a common search space (CSS).

20 Claims, 6 Drawing Sheets

(51) Int. Cl.
    *H04W 36/08*    (2009.01)
    *H04W 68/00*    (2009.01)
    *H04W 48/12*    (2009.01)
    *H04W 74/00*    (2009.01)

(52) U.S. Cl.
    CPC ....... *H04W 68/005* (2013.01); *H04W 74/002* (2013.01); *H04W 76/27* (2018.02)

(56) References Cited

OTHER PUBLICATIONS

RAN2 Chairman (Intel) accordingly for the captioned US application,"Chairman Notes", 3GPP TSG-RAN WG2 Meeting #101bis, Sanya, China, Apr. 16-20, 2018, total 133 pages.
3GPP TS 38.321 V15.2.0, 3rd Generation Partnership Project Technical Specification Group Radio Access Network; NR;Medium Access Control (MAC) protocol specification; Release 15; Total 73 pages; Jun. 2018.
Samsung, "RLF signalling for BWP", 3GPP TSG-RAN WG2 #100, Reno, Nevada, Nov. 27-Dec. 1, 2017, total 3 pages, R2-1713860.
NEC, "Impact to F1 for SI reception in Connected mode", 3GPP TSG-RAN WG2 #102, Busan, Korea, May 21-25, 2018, total 3 pages, R2-1808252.
NEC,"Summary of CB: #25_SysInfoUpdate_ActiveUEs", 3GPP TSG-RAN WG3 #101 bis, Chengdu, China, Oct. 8-12, 2018, total 2 pages, R3-186120.
Ericsson, "System info delivery for UE with multiple BWP", 3GPP TSG-RAN WG3 #102, Spokane, WA, USA, Nov. 12-16, 2018, total 4 pages, R3-186844.

\* cited by examiner

CONFIGURATION INFORMATION TRANSMISSION METHOD, CU AND DU, AND COMPUTER STORAGE MEDIUM

CROSS-REFERENCE OF RELATED APPLICATIONS

The present application is a US National Stage of International Application No. PCT/CN2019/089918, filed Jun. 4, 2019, which claims priority to Chinese Patent Application No. 201810873093.7, filed with the Chinese Patent Office on Aug. 2, 2018 and entitled "Configuration Information Transmission Method, CU and DU, and Computer Storage Medium", which is hereby incorporated by reference in its entirety.

FIELD

The present application relates to the field of communication technology, and in particular to a configuration information transmission method, a CU and a DU, and a computer storage medium.

BACKGROUND

In the traditional Long Term Evolution (LTE) communication system, the cell carrier bandwidth is not greater than the transmission bandwidth of the user equipment, so the network side can configure the total uplink and downlink bandwidth of the cell for the user equipment, and the user equipment can work on the overall cell carrier bandwidth. However, in the New Radio (NR) communication system, the cell carrier bandwidth is much larger than the transmission bandwidth of the user equipment, so the overall cell carrier bandwidth is divided into multiple Band Width Parts (BWPs), and one or more BWPs is/are configured for the user equipment, but there is usually only one active BWP among the multiple BWPs configured for the user equipment. The BWP configured with the Common Search Space (CSS) for acquiring the system information is called initial BWP.

For the Central Unit (CU) entity-Distributed Unit (DU) entity split scenarios, the DU entity is responsible for the configuration and scheduling of the BWPs, and the DU can know the configured BWPs of the user equipment and also know the currently activated BWP of the user equipment. Therefore, the CU entity can only know the configuration information of the BWPs, and does not know which BWP is currently activated by the user equipment. Thus, for a user equipment of which the currently activated BWP is the initial BWP, the network side can notify it of the updated system information by broadcasting, while for a user equipment of which the currently activated BWP is not the initial BWP, the network side can notify it of the updated system information or Public Warning System (PWS) notification through a dedicated signaling.

However, in the CU-DU split scenarios, the CU entity is responsible for the generation of dedicated signaling and broadcast message, and the currently activated BWP of the user equipment is determined by the DU entity, so the CU entity does not know whether the currently activated BWP of the user equipment is the initial BWP. Furthermore, when the notification of system information is required, the CU entity cannot decide whether to notify through a broadcast message or dedicated signaling. In order to enable the user equipment to receive the updated system information, the CU entity will send a dedicated signaling to each user equipment corresponding to all BWPs that are not configured with the CSS to notify the updated system information. In this way, the updated system information is also notified through a dedicated signaling even if it can be notified through a broadcast message, thereby resulting in the larger system overhead.

SUMMARY

The embodiments of the application provide a configuration information transmission method, a CU and a DU, and a computer storage medium, to reduce the system overhead.

In a first aspect, a configuration information transmission method is provided, which includes:

receiving, by a CU in an RAN, a first interface message from a DU of the RAN;

and the first interface message carries first indication information, the first indication information is used to indicate at least one user equipment, and a current active BWP of the at least one user equipment is not configured with a CSS.

In the embodiment of the application, the CU can know at least one user equipment of which the current active BWP is not configured with CSS through the first interface message from the DU, so that only at least one user equipment device is notified to the DU entity through the dedicated signaling, and then the system information is sent to these user equipments through the DU entity. For the user equipments that can receive the system information by broadcasting, the broadcast notification is still used, reducing the use rate of dedicated signaling, and thus reducing the system overhead and avoiding the waste of air interface resources.

In one embodiment, the first interface message carries updated system information; or, the first interface message is a feedback message of a second interface message, and the second interface message carries updated system information and is used to inform the DU that system information has been updated.

In the embodiment of the application, the DU entity knows whether the current active BWP of the user equipment is the initial BWP, and also knows whether the user equipment with the active BWP is configured with CSS, so the first interface message can carry the updated system information as an identifier to feed back at least one user equipment; or the first interface message may also be a feedback message of the second interface message sent by the CU to the DU to notify the CU that this is a user equipment of which the active BWP is not configured with CSS. The implementation mode is more flexible.

In one embodiment, after the CU in the RAN receives the first interface message from the DU in the RAN, the method further includes:

generating, by the CU, a reconfiguration message for the at least one user equipment, and the reconfiguration message carries the updated system information;

sending, by the CU, a downlink RRC transmission message to the DU to send the reconfiguration message to the at least one user equipment through the DU, and the downlink RRC transmission message carries the reconfiguration message.

In the embodiment of the application, when the system information changes, the services supported by the system may also change, so the user equipment needs to be reconfigured according to the updated system information to adapt to the services currently supported by the system. Therefore, after determining at least one user equipment, the CU entity may regenerate a reconfiguration message for the at least one user equipment, and then transmit the reconfiguration message to the user equipment device through the DU entity.

In one embodiment, the method further includes:

re-determining, by the CU, a special cell of a user equipment in an RRC connected state according to the first interface message;

sending, by the CU, a reconfiguration message to the user equipment, and the reconfiguration message is used to instruct the user equipment to perform handover to change the special cell.

The user equipment in the RRC connected state can be configured with a plurality of cell groups. In each cell group, the RAN configures a special cell and one or more secondary cells for the user equipment. In order to make the user equipment broadcast faster, when the service quality of the cell where the user equipment is located is poor, the user equipment needs to handover the cell. Therefore, in the embodiment of the application, the CU entity can re-determine the special cell of the user equipment in the RRC connected state according to the first interface message, to further inform the user equipment to change the special cell.

In one embodiment, before the CU in the RAN receives the first interface message from the DU of the RAN, the method further includes:

sending, by the CU, a third interface message to the DU, and the third interface message carries second indication information;

and the second indication information is used to instruct the DU to report the at least one user equipment, or the second indication information carries a period value and is used to instruct the DU to report the at least one user equipment periodically.

In the embodiment of the application, if the CU entity needs to instruct the user equipment to change the special cell, it can actively request the DU entity to report the user equipment of which the active BWP is not configured with CSS, or request the DU entity to periodically report the user equipment of which the active BWP is not configured with CSS, to further determine the special cell of the user equipment in the RRC connected state.

In one embodiment, re-determining, by the CU, the special cell of the user equipment in the RRC connected state according to the first interface message, includes:

determining, by the CU, a first ratio according to the first interface message, and the first ratio is a ratio of a first number to a second number, the first number is the number of user equipments which are currently served by any cell and of which current active BWPs are not configured with CSS, and the second number is the number of user equipments currently served by the any cell;

re-determining, by the CU, the special cell of the user equipment in the RRC connected state according to the first ratio.

In one embodiment, the method further includes:

determining, by the CU, a first ratio according to the first interface message, and the first ratio is a ratio of a first number to a second number, the first number is the number of user equipments which are currently served by any cell and of which current active BWPs are not configured with CSS, and the second number is the number of user equipments currently served by the any cell;

adjusting, by the CU, a cell reselection offset between cells according to the first ratio, and sending a configuration update message to the DU, so that the DU broadcasts the adjusted cell reselection offset to user equipments in an RRC inactivated state or RRC idle state.

In one embodiment, adjusting, by the CU, the cell reselection offset between cells according to the first ratio, includes:

when the CU determines that the first ratio is greater than or equal to a preset threshold, determining an adjustment value of the cell reselection offset according to the first ratio; and the greater the first ratio is, the greater the adjustment value is;

adjusting, by the CU, the cell reselection offset according to the adjustment value.

In the above two optional modes, the CU entity can monitor the number of user equipments currently served by any cell, and the number of user equipments currently served by any cell in at least one user equipment, so that the cell selection algorithm can be adjusted according to the ratio of them, making it difficult for a cell with a higher ratio to be selected as the special cell, to ensure as possible that the user equipment switch from a cell with slower broadcast to a cell with faster broadcast, and improve the transmission efficiency of broadcast messages. Alternatively, the CU entity can adjust the cell reselection offset between cells according to the ratio of them, so that the cell with a higher ratio is not easily selected as the resident cell, to ensure as possible that it can be more easy for the user equipment to obtain the updated system information through broadcast.

In a second aspect, a configuration message transmission method is provided, which includes:

generating, by a DU in an RAN, a first interface message, and the first interface message carries indication information, the indication information is used to indicate at least one user equipment, and a current active BWP of the at least one user equipment is not configured with a CSS;

sending, by the DU, the first interface message to a CU in the RAN.

In the embodiment of the present application, since the DU entity knows the user equipments of which the current active BWPs are not configured with CSS, the DU entity sends the first interface message to the CU entity to inform the CU entity of the user equipments of which the current active BWPs are not configured with CSS.

In one embodiment, before the DU in the RAN generates the first interface message, the method further includes:

generating, by the DU, updated system information;

or, receiving, by the DU, a second interface message from the CU, and the second interface message carries updated system information and is used to inform the DU that system information has been updated.

In the embodiment of the application, the DU entity may generate the first interface message after the system information is updated, or the DU entity may generate the first interface message after the CU entity informs that there is the system information, but there is no need to generate the first interface message when the CU entity does not need to know the user equipments of which the current active BWPs are not configured with CSS, thereby avoiding the excessive system information notifications through dedicated signaling, reducing the radio overhead, and avoiding the scheduling congestion.

In one embodiment, the method further includes:

receiving, by the DU, a third interface message from the CU, and the third interface message carries second indication information;

and the second indication information is used to instruct the DU to report the at least one user equipment, or the second indication information carries a period value and is used to instruct the DU to report the at least one user equipment periodically.

In the embodiment of the application, the DU entity can report the user equipments of which the current active BWPs are not configured with CSS after receiving the third interface message from the CU entity, thereby avoiding the excessive system information notifications through dedicated signaling, reducing the radio overhead, and avoiding the scheduling congestion.

In a third aspect, a CU entity in a radio access network is provided, where the CU entity includes:

a memory configured to store instructions;

a processor configured to read the instructions in the memory to perform the process of:

receiving a first interface message from a DU in an RAN via a transceiver, and the first interface message carries first indication information, the first indication information is used to indicate at least one user equipment, and a current active BWP of the at least one user equipment is not configured with a CSS;

the transceiver configured to receive and send data under control of the processor.

In one embodiment, the first interface message carries updated system information; or, the first interface message is a feedback message of a second interface message, and the second interface message carries updated system information and is used to inform the DU that system information has been updated.

In one embodiment, the processor is further configured to:

generate a reconfiguration message for the at least one user equipment, and the reconfiguration message carries the updated system information;

send a downlink RRC transmission message to the DU via the transceiver to send the reconfiguration message to the at least one user equipment through the DU, and the downlink RRC transmission message carries the reconfiguration message.

In one embodiment, the processor is further configured to:

re-determine a special cell of a user equipment in an RRC connected state according to the first interface message;

send a reconfiguration message to the user equipment via the transceiver, and the reconfiguration message is used to instruct the user equipment to perform handover to change the special cell.

In one embodiment, the processor is further configured to:

send a third interface message to the DU via the transceiver, and the third interface message carries second indication information;

and the second indication information is used to instruct the DU to report the at least one user equipment, or the second indication information carries a period value and is used to instruct the DU to report the at least one user equipment periodically.

In one embodiment, the processor is configured to:

determine a first ratio according to the first interface message, and the first ratio is a ratio of a first number to a second number, the first number is the number of user equipments which are currently served by any cell and of which current active BWPs are not configured with CSS, and the second number is the number of user equipments currently served by the any cell;

re-determine the special cell of the user equipment in the RRC connected state according to the first ratio.

In one embodiment, the processor is further configured to:

determine a first ratio according to the first interface message, and the first ratio is a ratio of a first number to a second number, the first number is the number of user equipments which are currently served by any cell and of which current active BWPs are not configured with CSS, and the second number is the number of user equipments currently served by the any cell;

adjust a cell reselection offset between cells according to the first ratio, and send a configuration update message to the DU, so that the DU broadcasts the adjusted cell reselection offset to user equipments in an RRC inactivated state or RRC idle state.

In one embodiment, the processor is configured to:

when the CU determines that the first ratio is greater than or equal to a preset threshold, determine an adjustment value of the cell reselection offset according to the first ratio; and the greater the first ratio is, the greater the adjustment value is;

adjust the cell reselection offset according to the adjustment value.

For the technical effects of the CU entity according to the embodiments of the application, the reference may be made to the technical effects of the implementations of the first aspect described above, which will not be repeated here.

In a fourth aspect, a DU entity in a radio access network is provided, where the DU entity includes:

a memory configured to store instructions;

a processor configured to read the instructions in the memory to perform the process of:

generating a first interface message, and the first interface message carries indication information, the indication information is used to indicate at least one user equipment, and a current active BWP of the at least one user equipment device is not configured with a CSS;

sending the first interface message to a CU in the RAN via a transceiver. the transceiver configured to receive and send data under control of the processor.

In one embodiment, the processor is further configured to:

generate updated system information;

or, receive a second interface message from the CU via the transceiver, and the second interface message carries updated system information and is used to inform the DU that system information has been updated.

In one embodiment, the transceiver is further configured to:

receive a third interface message from the CU, and the third interface message carries second indication information;

and the second indication information is used to instruct the DU to report the at least one user equipment, or the second indication information carries a period value and is used to instruct the DU to report the at least one user equipment periodically.

For the technical effects of the DU entity according to the embodiments of the application, the reference may be made to the technical effects of the implementations of the second aspect described above, which will not be repeated here.

In a fifth aspect, a CU entity in a radio access network is provided, where the CU entity includes:

a receiving device configured to receive a first interface message from a DU in the RAN, and the first interface message carries first indication information, the first indication information is used to indicate at least one user equipment, and a current active BWP of the at least one user equipment is not configured with a CSS;

a storage device configured to store the first interface message.

In one embodiment, the first interface message carries updated system information; or, the first interface message is a feedback message of a second interface message, and the second interface message carries updated system information and is used to inform the DU that system information has been updated.

In one embodiment, the CU entity further includes:

a processing device configured to generate a reconfiguration message for the at least one user equipment, and the reconfiguration message carries the updated system information;

a sending device configured to send a downlink RRC transmission message to the DU to send the reconfiguration message to the at least one user equipment through the DU, and the downlink RRC transmission message carries the reconfiguration message.

In one embodiment, the processing device is further configured to: re-determine a special cell of a user equipment in an RRC connected state according to the first interface message; the sending device is further configured to: send a reconfiguration message to the user equipment, and the reconfiguration message is used to instruct the user equipment to perform handover to change the special cell.

In one embodiment, the sending device is further configured to: send a third interface message to the DU, and the third interface message carries second indication information; and the second indication information is used to instruct the DU to report the at least one user equipment, or the second indication information carries a period value and is used to instruct the DU to report the at least one user equipment periodically.

In one embodiment, the processing device is configured to:

determine a first ratio according to the first interface message, and the first ratio is a ratio of a first number to a second number, the first number is the number of user equipments which are currently served by any cell and of which current active BWPs are not configured with CSS, and the second number is the number of user equipments currently served by the any cell;

re-determine the special cell of the user equipment in the RRC connected state according to the first ratio.

In one embodiment, the processing device is configured to:

determine a first ratio according to the first interface message, and the first ratio is a ratio of a first number to a second number, the first number is the number of user equipments which are currently served by any cell and of which current active BWPs are not configured with CSS, and the second number is the number of user equipments currently served by the any cell;

adjust a cell reselection offset between cells according to the first ratio, and send a configuration update message to the DU, so that the DU broadcasts the adjusted cell reselection offset to user equipments in an RRC inactivated state or RRC idle state.

In one embodiment, the processing device is configured to:

when it is determined that the first ratio is greater than or equal to a preset threshold, determine an adjustment value of the cell reselection offset according to the first ratio; and the greater the first ratio is, the greater the adjustment value is;

adjust the cell reselection offset according to the adjustment value.

For the technical effects of the CU entity according to the embodiments of the application, the reference may be made to the technical effects of the implementations of the first aspect described above, which will not be repeated here.

In a sixth aspect, a DU entity in a radio access network is provided, where the DU entity includes:

a generating device configured to generate a first interface message, and the first interface message carries indication information, the indication information is used to indicate at least one user equipment, and a current active BWP of the at least one user equipment is not configured with a CSS;

a sending device configured to send the first interface message to a CU in the RAN.

In one embodiment, the DU entity further includes a receiving device, and:

the generating device is further configured to: generate updated system information;

or, the receiving device is configured to: receive a second interface message from the CU, and the second interface message carries updated system information and is used to inform the DU that system information has been updated.

In one embodiment, the receiving device is further configured to:

receive a third interface message from the CU, and the third interface message carries second indication information;

and the second indication information is used to instruct the DU to report the at least one user equipment, or the second indication information carries a period value and is used to instruct the DU to report the at least one user equipment periodically.

For the technical effects of the DU entity according to the embodiments of the application, the reference may be made to the technical effects of the implementations of the second aspect described above, which will not be repeated here.

In a seventh aspect, a computer storage medium with a computer program stored thereon is provided, where the computer program, when executed by a processor, causes the processor to perform the method as described in any one of the first or second aspect.

In the embodiment of the application, the CU can know at least one user equipment of which the current active BWP is not configured with CSS through the first interface message from the DU, so that only at least one user equipment is notified to the DU entity through the dedicated signaling, and then the system information is sent to these user equipments through the DU entity. For the user equipments that can receive the system information by broadcasting, the broadcast notification is still used, reducing the use rate of dedicated signaling, and thus reducing the system overhead and avoiding the waste of radio resources.

DETAILED DESCRIPTION

In order to make the objects, technical solutions and advantages of the application clearer, the technical solutions in the embodiments of the application will be described clearly and completely below in combination with the accompanying drawings in the embodiments of the application.

At present, for non-CU-DU split scenarios, the network side itself can know the configured BWPs of a user equipment, and also know the currently activated BWP of the user equipment. Therefore, for the user equipment of which the currently activated BWP is the initial BWP, the network side can notify it of the updated system information or PWS notification by paging, and the user equipment in the idle or inactive state can obtain the paging message and system information by monitoring the initial BWP. The user equipment in the active state can learn about the system information update notification and/or PWS notification by monitoring the paging in the currently activated BWP, and then can monitor the updated system information and/or PWS notification at the corresponding moment. When the activated BWP is not configured with a common search space for obtaining the paging messages and system information, the UE cannot obtain the updated system information and PWS notification in the currently activated BWP through broadcast, and the network side can notify it of the updated system information or PWS notification through dedicated signaling.

However, in the CU-DU split scenarios, the CU entity is responsible for the generation of dedicated signaling and broadcast message, and the currently activated BWP of the user equipment is determined by the DU entity, so the CU entity does not know whether the currently activated BWP of the user equipment is the initial BWP. Furthermore, when the notification of system information is required, the CU entity cannot decide whether to notify through a broadcast message or dedicated signaling. In this way, the updated system information is also notified through a dedicated signaling even if it can be notified through a broadcast message, thereby resulting in the larger system overhead.

In view of this, an embodiment of the application provides a configuration information transmission method. In this method, the CU can know at least one user equipment of which the current active BWP is not configured with CSS through the first interface message from the DU, so that only at least one user equipment is notified to the DU entity through the dedicated signaling, and then the system information is sent to these user equipments through the DU entity. For the user equipments that can receive the system information by broadcasting, the broadcast notification is still used, reducing the use rate of dedicated signaling, and thus reducing the system overhead and avoiding the waste of radio resources.

The technical solutions according to the embodiments of the application will be introduced below with reference to the drawings.

Figure 1:
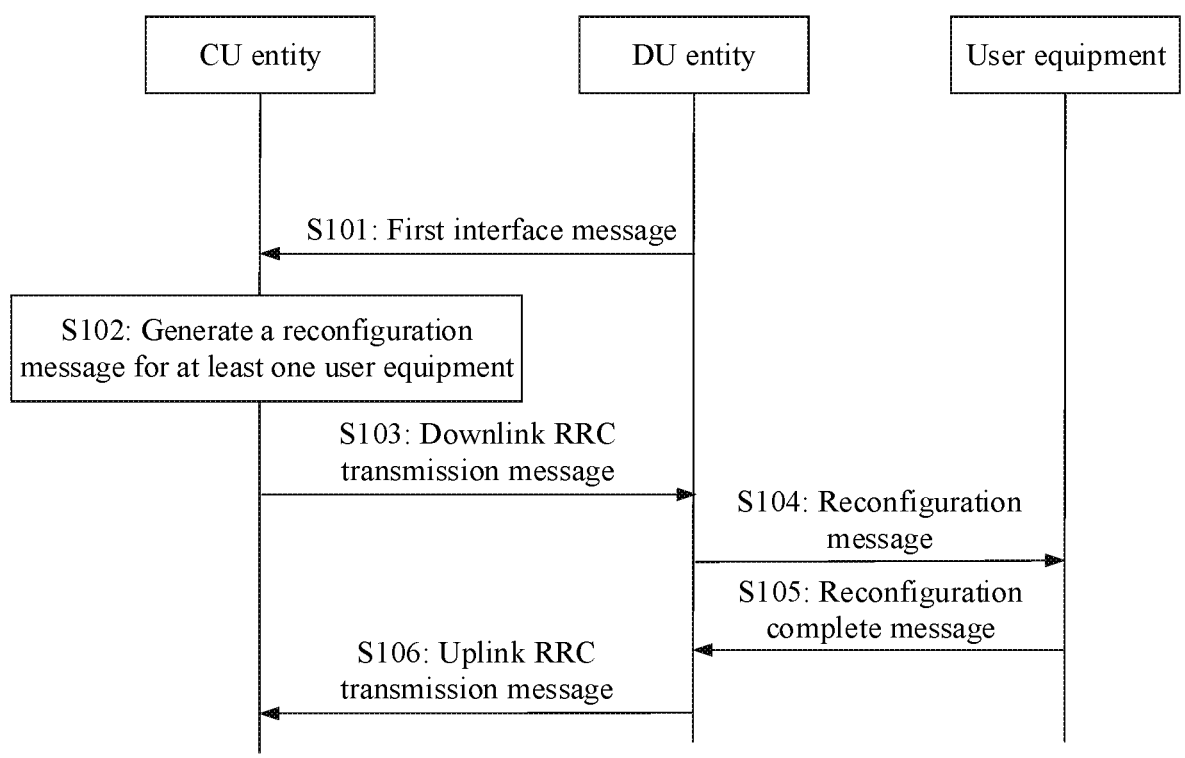
FIG. 1 is a schematic flowchart of a configuration information transmission method according to an embodiment of the application.

Referring to FIG. 1, an embodiment of the application provides a configuration information transmission method, where the process of the method is described as follows. Since the configuration information transmission method involves the interaction process between the CU entity and the DU entity, the processes performed by the CU entity and the DU entity side will be described together in the following process description.

S101: a CU receives a first interface message from a DU, and the first interface message carries first indication information, the first indication information is used to indicate at least one user equipment, and a current active BWP of the at least one user equipment is not configured with a CSS.

Figure 2:
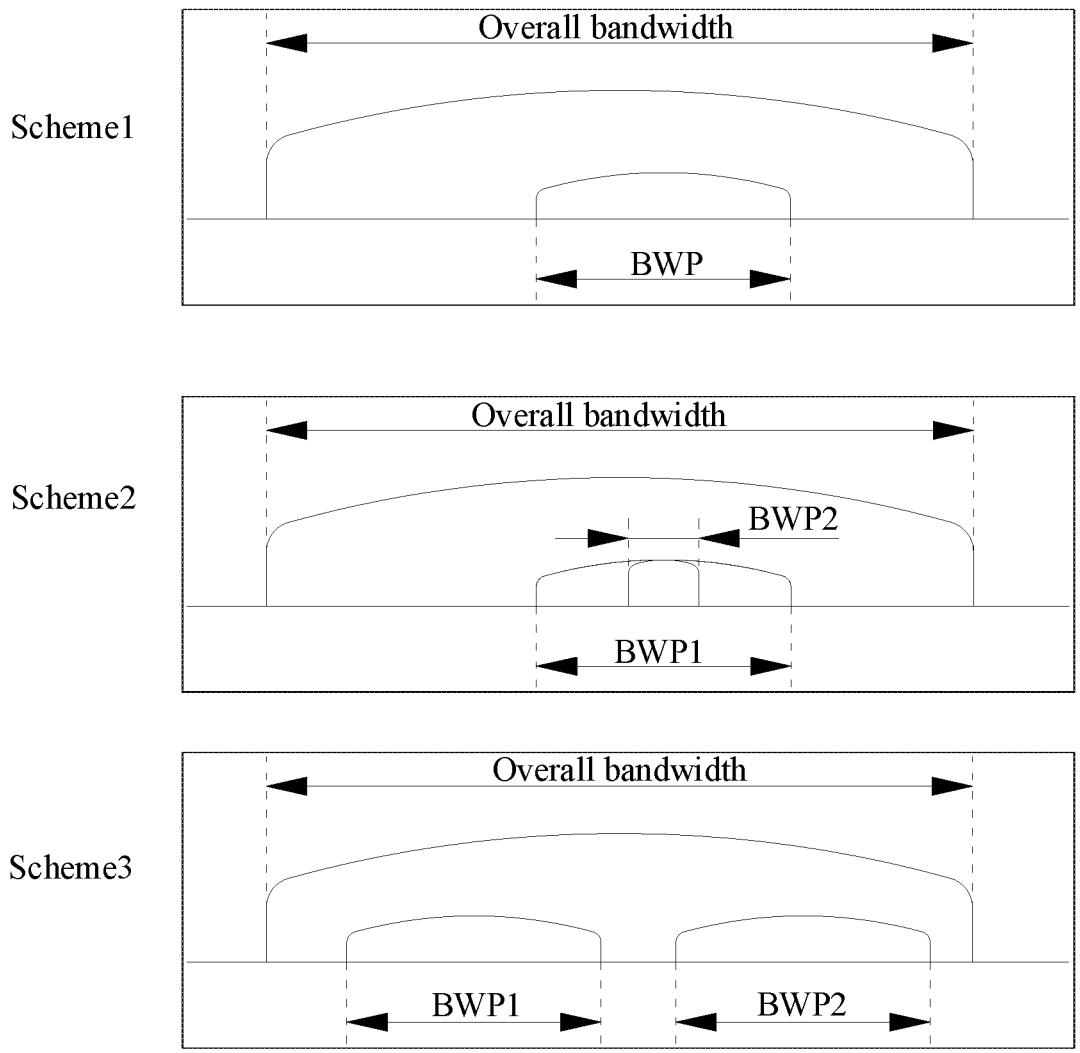
FIG. 2 is a schematic diagram of a BWP configuration scheme according to an embodiment of the application.

In the embodiment of the application, the cell carrier bandwidth that can be utilized at the network side may be as high as 400 MHz, which is much larger than the user equipment's transmission bandwidth of 20 MHz. Therefore, the overall cell carrier bandwidth is divided into a plurality of BWPs, and one or more BWPs are configured for the user equipment, and a part of the BWPs are activated for the uplink and downlink transmission of the user equipment. The activated downlink BWP is called active Downlink (DL) BWP, and the activated uplink BWP is called active Uplink (UL) BWP. Generally, for a user equipment, only one DL BWP and one UL BWP are allowed to be activated at a time, and the inactivated BWP cannot be used for uplink and downlink signaling and data transmission. As shown in FIG. 2, it is a schematic diagram of several BWP configuration schemes. In a first scheme, one BWP in the overall bandwidth is used for the user equipment's uplink and downlink signaling and data transmissions, so the user equipment's uplink and downlink signaling and data transmissions are all performed in this BWP; in a second scheme, two BWPs in the overall bandwidth are used for the user equipment's uplink and downlink signaling and data transmissions, namely BWP1 and BWP2, and there is a certain overlap in resources between the two BWPs; in a third scheme, two BWPs in the overall bandwidth are used for the user equipment's uplink and downlink signaling and data transmissions, namely BWP1 and BWP2, and there is no overlap in resources between the two BWPs.

In order to expand the coverage area and centrally manage UEs, the network side can adopt a CU-DU split deployment, and the Radio Resource Control (RRC) entity and Packet Data Convergence Protocol (PDCP) entity of the network side are deployed in the CU entity, other underlying entities are deployed in the DU entity, the CU entity and the DU entity are connected through an F1 interface, and one CU entity can connect to and manage multiple DU entities.

In the CU-DU split scenario, the currently activated BWP of the user equipment is determined by the DU entity, so the CU entity does not know the currently activated BWP of the user equipment, but the CU entity knows which BWPs have been configured for the user equipment, and the CU entity knows which BWPs are non-initial BWPs, so the CU entity knows whether the BWPs configured for the user equipment includes a non-initial BWP. Therefore, after the system information is updated, and when the CU entity needs to notify the user equipment of the updated system information, the CU entity may generate a signaling carrying the system information for the user equipment configured with a non-initial BWP. But the CU entity does not know which is the currently activated BWP, and also does not know whether the currently activated BWP of the user equipment is non-initial BWP. Then, in order to avoid the omission of notifying the user equipment of the system information, the CU entity notifies the system information through dedicated signaling when the system information needs to be notified, thereby resulting in the larger system overhead.

The non-initial BWP is a BWP that is not configured with the CSS required for obtaining the system information through broadcast.

In the embodiment of the application, if all BWPs in the BWP configuration of the user equipment are configured with the CSSs required for obtaining the system information through broadcast, then the user equipment can always obtain the updated system information through broadcast no matter which BWP is currently activated by the user equipment. Therefore, for this type of user equipment, the CU entity will not generate the dedicated signaling for it, but will notify it of the updated system information through broadcast.

Exemplarily, a communication system includes user equipment 1, user equipment 2, and user equipment 3. The BWPs configured by the system for the user equipment 1 includes BWP1 and BWP2, the BWPs configured by the system for the user equipment 2 includes BWP1 and BWP3, and the BWPs configured by the system for the user equipment 3 includes BWP2 and BWP3, and the BWP1 is a non-initial BWP, and the BWP2 and BWP3 are initial BWPs. Then both of the BWP configurations of the user equipment 1 and user equipment 2 include the BWP1, so the CU entity will generate the dedicated signaling for the user equipment 1 and user equipment 2; and for the user equipment 3, the BWP2 and BWP3 in the BWP configuration of the user equipment 3 are both initial BWPs, so the CU entity can determine that the user equipment 3 can obtain the system information by broadcasting, and will generate a broadcast message (which may be a PWS notification for example) for broadcasting the system information and send the broadcast message to the DU entity through an interface message between the CU entity and the DU entity.

Since the CU entity does not know which is the current active BWP, it also does not know whether the current active BWP of the user equipment is a non-initial BWP. The DU entity knows whether the current active BWP of the user equipment is a non-initial BWP. Therefore, in the embodiment of the application, the CU entity can know whether the current active BWP of the user equipment is a non-initial BWP through the DU entity. The CU entity may receive a first interface message from the DU entity, and the first interface message may carry the first indication information to indicate at least one user equipment of which the current active BWP is not configured with CSS. Therefore, the CU notifies the system information through dedicated signaling when there is a need to notify the system information for at least one user equipment, and notifies the system information through broadcast messages when there is a need to notify the system information for other user equipments, thereby reducing the system overhead and saving the air interface resources.

In the embodiment of the application, the DU entity can use the existing first interface message between it and the CU entity to send the first indication information, to avoid adding a new interface message and realize the multiplexing of the interface message; or, a new dedicated interface message can be defined, so that the type of information carried in the interface message can be quickly known through the dedicated interface message.

Specifically, the first indication information may be a list including at least one user equipment, or may be multiple lists, and each list includes multiple user equipments. In order to distinguish from other uses, the DU entity may carry the label information in the first interface message to indicate that the first indication information carries the system information. Then, after receiving the first interface message, the CU entity can know that the first interface message carries the first indication information including the system information through the label information. Of course, the DU entity may not carry the above label information in the first interface message. Then, after receiving the first interface message, the CU entity can also obtain the first indication information by parsing the first interface message, thereby knowing the specific content carried in the first interface message.

In a possible implementation, the DU entity actively triggers a system information update process, for example, the DU entity triggers the update of the system information block SIB1 and broadcasts the updated SIB1. At this time, the DU entity can send a first interface message carrying the updated SIB1 to the CU entity, and the first interface message also carries a user equipment list including at least one user equipments.

Specifically, the first interface message is a feedback message of a second interface message, and the second interface message may be sent by the CU entity to the DU entity when the system information has been updated, to inform the DU entity that the system information has been updated. Alternatively, the first interface message may also define a new interface message between the CU entity and the DU entity, where the interface message is dedicated to sending the first indication information. Then, the DU entity may use the interface message to send the first indication information to the CU entity, Correspondingly, after receiving the interface message, the CU entity can know according to the interface message that this message is an interface message carrying the first indication information.

In a possible embodiment, the CU entity actively triggers a system information update process, for example, the CU entity triggers the update of the system information block SIB 1. in this way, the CU entity may send a second interface message to the DU entity to indicate that the DU entity needs to adjust for the SIB1. After receiving the second interface message, the DU entity will broadcast the updated SIB1 and feedback a first interface message carrying the updated SIB1 to the CU entity, and the first interface message also carries a user equipment list including at least one user equipment.

Alternatively, the CU entity actively triggers a PWS update process, and in this way, the CU entity can send a request message to the DU entity to inform the DU entity that the PWS is updated. After receiving the request message, the DU entity will broadcast the updated PWS and feedback a first interface message carrying the updated PWS to the CU entity, and the first interface message also carries a user equipment list including at least one user equipment.

When the CU entity feeds back the first interface message carrying the updated SIB1, for example, following the example of user equipment 1 to user equipment 3 described above, the DU entity may carry the first indication information indicating the user equipment 1 and user equipment 2 in a same interface message and send it to the CU entity, or the DU entity may carry the first indication information indicating the user equipment 1 and user equipment 2 in different interface messages and send them to the DU entity.

In an embodiment of the application, after receiving the first interface message, the CU entity may generate the configuration information of the user equipment through the first interface message, and send the configuration information to the user equipment, so that the user equipment can reconfigure according to the configuration information.

S102: the CU generates a reconfiguration message for at least one user equipment, and the reconfiguration message carries the updated system information.

S103: the CU sends a downlink RRC transmission message to the DU to instruct the DU to send the reconfiguration message to at least one user equipment, and the downlink RRC transmission message carries the reconfiguration message.

S104: the DU forwards the reconfiguration message carried in the downlink RRC transmission message to at least one user equipment.

When the system information is updated, the services that the system can support may also change, so the user equipment needs to be reconfigured according to the updated system information to adapt to the services currently supported by the system. In an embodiment of the application, after receiving the first interface message, the CU entity can determine at least one user equipment indicated by the first interface message and generate a reconfiguration message for the at least one user equipment, and the reconfiguration information carries the updated system information. The CU sends the reconfiguration message to the DU through a downlink RRC transmission message, and the DU transmits the received reconfiguration message to the at least one user equipment, so that the at least one user equipment is reconfigured. The process in which the CU sends the reconfiguration message to the user equipment through the DU belongs to the scope of the prior art, so it will not be repeated here.

S105: at least one user equipment sends a reconfiguration complete message to the DU.

S106: the DU sends an uplink RRC transmission message to the CU, and the uplink RRC transmission message carries the reconfiguration complete message.

After the user equipment receives the reconfiguration message, or after the user equipment completes the reconfiguration, it will feed back the reconfiguration complete message to the DU. After receiving the reconfiguration complete message from the user equipment, the DU sends an uplink RRC transmission message to the CU, and the uplink RRC transmission message carries the reconfiguration complete message to inform the CU that the user equipment has completed the reconfiguration.

Following the example of user equipment 1 to user equipment 3 described above, the user equipment 1 receives a reconfiguration message through the BWP1, and thus obtains the updated system information from the reconfiguration message. After receiving the reconfiguration message or completing the reconfiguration according to the reconfiguration message, the user equipment 1 feeds back a reconfiguration complete message to the DU to inform the DU that it has received the reconfiguration message. After receiving the reconfiguration complete message, the DU sends an uplink RRC transmission message to the CU to notify the CU that the user equipment has completed the configuration. The user equipment 2 receives a reconfiguration message through the BWP2, and thus obtains the updated system information from the reconfiguration message. After receiving the reconfiguration message or completing the reconfiguration according to the reconfiguration message, the user equipment 2 feeds back a reconfiguration complete message to the DU. After receiving the reconfiguration complete message, the DU sends an uplink RRC transmission message to the CU to notify the CU that the user equipment device has completed the configuration. The process in which the user equipment device sends the reconfiguration message to the CU through the DU belongs to the scope of the prior art, so it will not be repeated here.

Generally, a user equipment in the RRC connected state can be configured with a plurality of cell groups. For each cell group, the RAN configures a special cell (SpCell) for the user equipment. In addition, the RAN can also configure one or more secondary cells (SCells) for the user equipment. The user equipment only monitors the broadcast in the special cell, and does not monitor the broadcast of the secondary cell. During the connection process, RAN can initiate handover at any time based on the cell signal quality, cell load and other information, and instruct the user equipment to change its special cell, so that the user equipment can handover to a cell with faster broadcast. For the RAN with CU/DU split structure, the selection of the special cell is performed by the CU entity, and the handover is also initiated by the CU entity.

However, the user equipment in the RRC inactive state or RRC idle state does not keep the air interface connection with the RAN, but may autonomously select a resident cell. The user equipment needs to measure the signal quality of the resident cell and other cells at any time. According to the cell reselection algorithm, when a certain condition is met, the user equipment performs the cell reselection process to change its resident cell. There are some input values in the cell reselection algorithm, where these input values are obtained by broadcasting the system information, including cell reselection offset ($Qoffset_{s,n}$) between cells. The larger $Qoffset_{s,n}$ means that the cell is less likely to be selected as a resident cell. For the RAN adopting the CU/DU split structure, the system information block containing $Qoffset_{s,n}$ is generated by the CU entity.

In order to enable the user equipment to handover to a cell with faster broadcast, in an embodiment of the application, corresponding implementation modes are respectively provided for the user equipment in the RRC connected state and the user equipment in the RRC inactive state or RRC idle state.

First case: for a user equipment in the RRC connected state.

Figure 3:
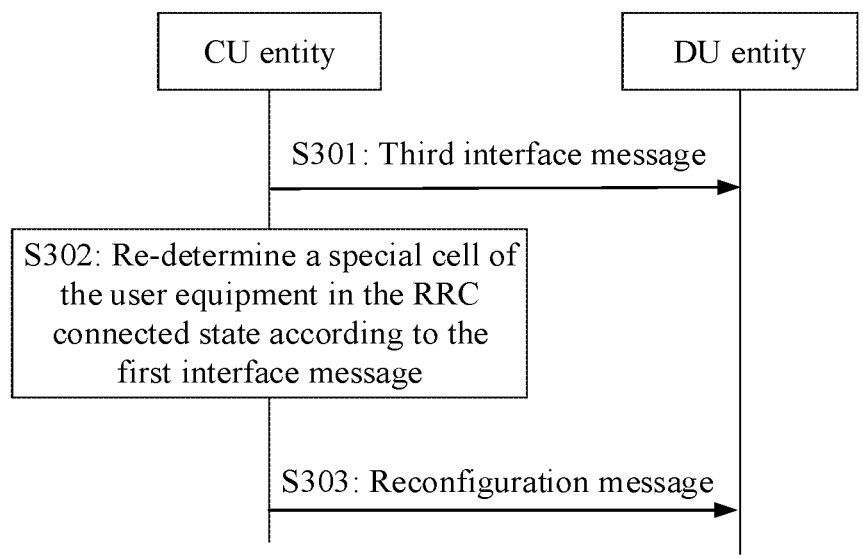
FIG. 3 is a schematic flowchart of a method for determining a special cell according to an embodiment of the application.

Referring to FIG. 3, in an embodiment of the application, the CU entity may instruct the DU to notify at least one user equipment before initiating the special cell execution.

S301: the CU entity sends a third interface message to the DU entity, where the third interface message carries the second indication information to instruct the DU entity to report at least one user equipment.

Specifically, the third interface message may also carry a period value to instruct the DU entity to report at least one user equipment periodically. After receiving the third interface message, the DU entity may directly send a list of at least one user equipment to the CU entity; or the DU entity may send multiple list of at least one user equipment to the CU entity. For example, the DU entity may group user equipments corresponding to one cell into one list, and the DU entity divides at least one user equipment into multiple lists and then sends them to the CU entity. If the third interface message carries a period value, the DU entity reports at least one user equipment to the CU entity periodically according to the period value. For example, the DU entity can start a timer. When the timer expires, the DU entity reports at least one user equipment to the CU entity and restarts the timer at the same time.

S302: the CU entity re-determines a special cell of the user equipment in the RRC connected state according to the first interface message.

Specifically, the CU entity determines a first ratio according to the first interface message.

In an embodiment of the application, the first ratio is a ratio of a first number to a second number, and the first number is the number of user equipments which are currently served by any cell and of which the current active BWPs are not configured with CSS, and the second number is the number of user equipments currently served by the any cell.

The CU entity can adjust the special cell selection algorithm of each cell according to at least one user equipment reported by the DU entity, so that it is more difficult for certain cells to be selected as special cells or resident cells, to realize the node self-optimization. The special cell selection algorithm here is the existing technology, and will not be repeated here.

Specifically, for each cell, the CU entity calculates the first ratio and adjusts the special cell selection algorithm according to the first ratio, to re-determine the special cell of the user equipment in the RRC connected state, so that it is more difficult for a cell with the higher first ratio to be selected as a special cell or resident cell, to ensure as possible that the user equipment can receive the system information updates faster.

S303: the CU entity sends a reconfiguration message to the DU entity to inform the DU entity to send the reconfiguration message to the user equipment.

The CU entity re-determines the special cell of the user equipment in the RRC connected state, then the CU entity can judge that the user equipment in the RRC connected state should handover to another cell according to the cell selection algorithm, and then the CU entity can send a reconfiguration message to the user equipment in the RRC connected state. For example, the CU entity may send the reconfiguration message to the DU entity, and then the DU entity sends the reconfiguration message to the user equipment in the RRC connected state to instruct the user equipment to perform handover to change the special cell.

Second case: for a user equipment in the RRC inactive state or RRC idle state.

Figure 4:
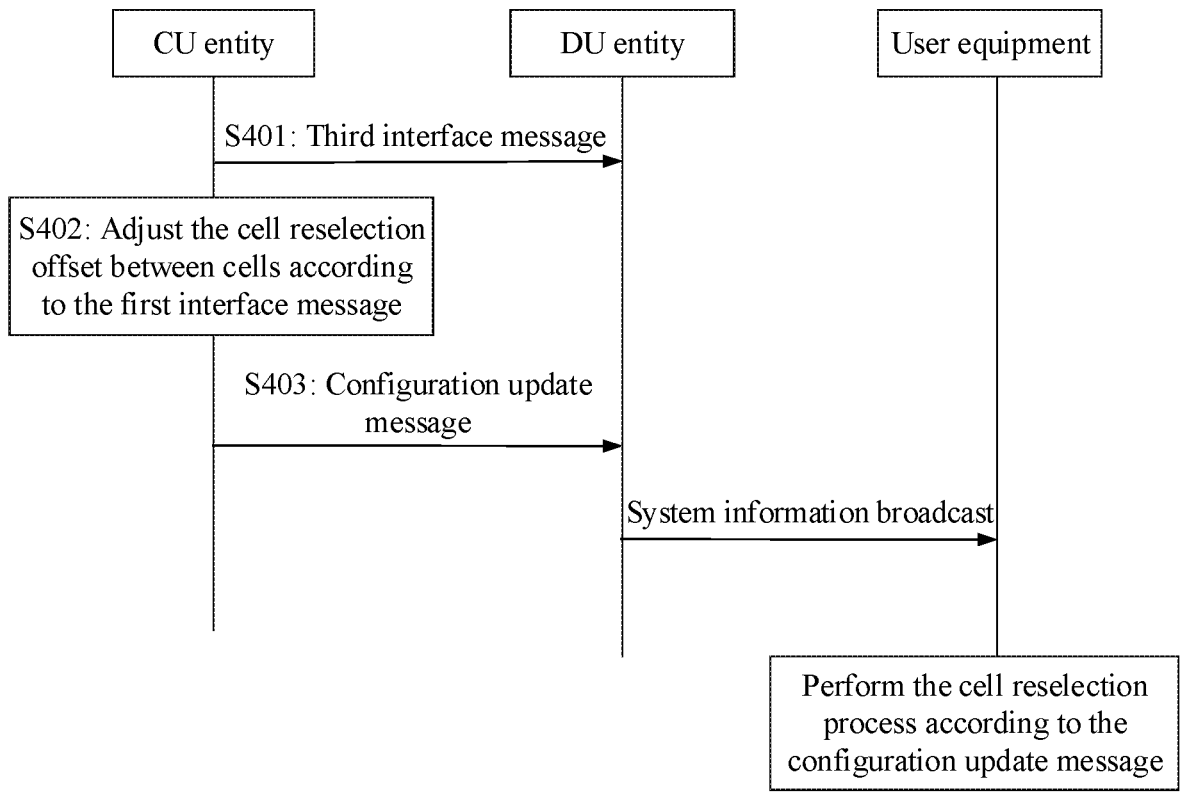
FIG. 4 is a schematic flowchart of a cell reselection method according to an embodiment of the application.

Referring to FIG. 4, in an embodiment of the application, the CU entity may instruct the DU to notify at least one user equipment before initiating the special cell execution.

S401: the CU entity sends a third interface message to the DU entity, where the third interface message carries the second indication information to instruct the DU entity to report at least one user equipment.

Specifically, the third interface message may also carry a period value to instruct the DU entity to report at least one user equipment periodically. After receiving the third interface message, the DU entity may directly send a list of at least one user equipment to the CU entity; or the DU entity may send multiple lists of at least one user equipment to the CU entity. For example, the DU entity may group user equipments corresponding to one cell into one list, and the DU entity divides at least one user equipment device into multiple lists and then sends them to the CU entity. If the third interface message carries a period value, the DU entity reports at least one user equipment to the CU entity periodically according to the period value. For example, the DU entity can start a timer. When the timer expires, the DU entity reports at least one user equipment device to the CU entity and restarts the timer at the same time.

S402: the CU entity adjusts the cell reselection offset between cells according to the first interface message.

Specifically, the CU entity determines a first ratio according to the first interface message. In an embodiment of the application, the first ratio is a ratio of a first number to a second number, and the first number is the number of user equipments which are currently served by any cell and of which the current active BWPs are not configured with CSS, and the second number is the number of user equipments currently served by the any cell.

The CU entity can adjust the cell selection parameters of each cell for each cell under the jurisdiction of the DU entity according to at least one user equipment reported by the DU entity, so that it is more difficult for certain cells to be selected as resident cells, to realize the node self-optimization.

Specifically, for each cell, the CU entity calculates the first ratio, and adjusts the cell reselection offset between cells according to the first ratio. In a possible embodiment, if the CU determines that the first ratio is greater than or equal to a preset threshold, it determines to adjust the cell reselection offset, and the preset threshold may be a possible value based on experience or experiment. When adjusting the cell reselection offset, the CU may determine the adjustment value of the cell reselection offset according to the magnitude of the first ratio, or may determine the adjustment value of the cell reselection offset according to the change magnitude of the first ratio. When the first ratio is larger, the adjustment value of the cell reselection offset is larger, so that the cell corresponding to the higher cell reselection offset is not easily selected as a resident cell. Therefore, after adjusting the cell reselection offset, the CU broadcasts the adjusted cell reselection offset to the user equipment in the RRC inactive state or RRC idle state, so that the user equipment device in the RRC inactive state or RRC idle state reselects a cell, to ensure as possible that the user equipment can receive the system information update faster after entering the connected state, that is, can receive the updated system information by broadcasting more easily.

S403: the CU entity sends a configuration update message to the DU entity.

After readjusting the cell reselection offset, the CU entity can generate the configuration update message which carries the cell reselection offset. The CU entity sends the configuration update message to the DU entity, and after receiving the configuration update message, the DU entity broadcasts the system information containing the cell reselection offset. In this way, after receiving the configuration update message, the DU entity can feed back a response message to the CU entity to inform the CU entity that the configuration update message has been received.

The user equipment in the RRC inactive state or RRC idle state judges that it should handover to another cell according to the cell reselection algorithm and the cell reselection offset in the broadcast system information, and then performs the cell reselection process to handover from the current cell to another cell, to ensure as possible that the user equipment can handover to a cell with faster broadcast. The cell reselection algorithm and the cell reselection process are existing technologies, and will not be repeated here.

In summary, in the embodiment of the application, the CU can know at least one user equipment of which the current active BWP is not configured with CSS through the first interface message from the DU, so that only at least one user equipment is notified to the DU entity through the dedicated signaling, and then the system information is sent to these user equipments through the DU entity. For the user equipments that can receive the system information by broadcasting, the broadcast notification is still used, reducing the use rate of dedicated signaling, and thus reducing the system overhead and avoiding the waste of air interface resources.

On this basis, the CU entity of the embodiment of the application can perform the node self-optimization based on at least one user equipment fed back by the DU entity. Compared with the prior art (a cell that can only send the system information through dedicated signaling is selected as a special cell), the probability of selecting a special cell by using the prior art is reduced, thereby reducing the frequency of sending the system information through dedicated signaling, and further saving the radio resources.

The devices according to the embodiments of the application will be introduced below with reference to the drawings of the specification.

Figure 5:
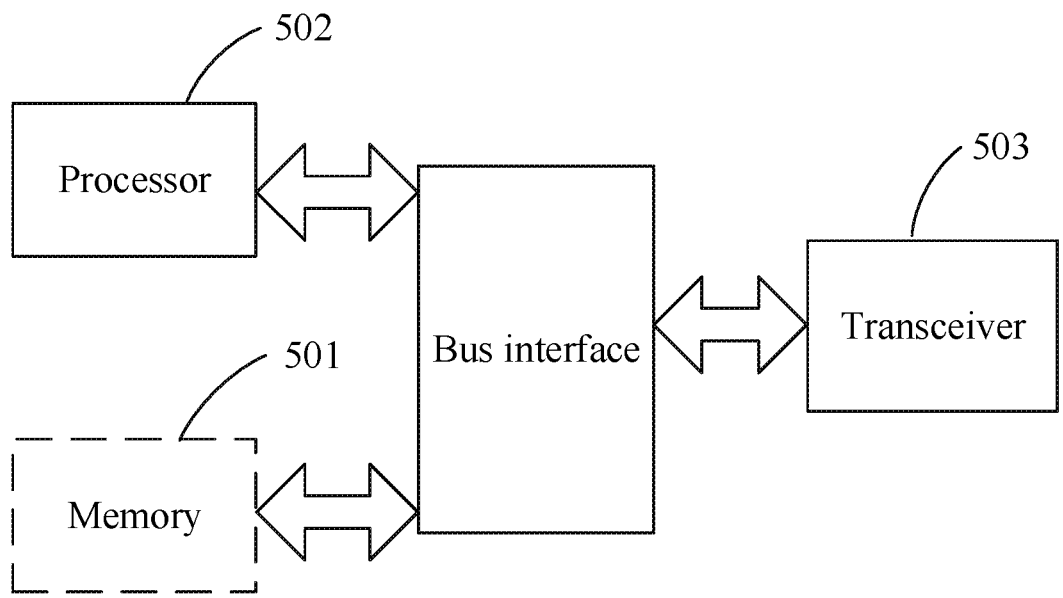
FIG. 5 is a schematic structural diagram of a CU entity according to an embodiment of the application.

Referring to FIG. 5, based on the same inventive concept, an embodiment of the application provides a CU entity in a wireless access network, including: a memory 501, a processor 502 and a transceiver 503, and the memory 501 and the transceiver 503 may be connected to the processor 502 through a bus interface (taking this as an example in FIG. 5), or may be connected to the processor 502 through special connection lines.

The memory 501 may be configured to store programs. The transceiver is configured to receive and send data under the control of the processor. The processor 502 may be configured to read the programs in the memory 501 to perform the process of:

receiving a first interface message from a DU in the RAN via the transceiver 503, and the first interface message carries first indication information, the first indication information is used to indicate at least one user equipment, and a current active BWP of the at least one user equipment is not configured with a CSS.

In one embodiment, the first interface message carries updated system information; or, the first interface message is a feedback message of a second interface message, and the second interface message carries updated system information and is used to inform the DU that system information has been updated.

In one embodiment, the processor 502 is further configured to:

generate a reconfiguration message for the at least one user equipment, and the reconfiguration message carries the updated system information;

send a downlink RRC transmission message to the DU via the transceiver 503 to send the reconfiguration message to the at least one user equipment through the DU, and the downlink RRC transmission message carries the reconfiguration message.

In one embodiment, the processor 502 is further configured to:

re-determine a special cell of a user equipment in an RRC connected state according to the first interface message;

send a reconfiguration message to the user equipment via the transceiver 503, and the reconfiguration message is used to instruct the user equipment to perform handover to change the special cell.

In one embodiment, the processor 502 is further configured to:

send a third interface message to the DU via the transceiver 503, and the third interface message carries second indication information;

and the second indication information is used to instruct the DU to report the at least one user equipment, or the second indication information carries a period value and is used to instruct the DU to report the at least one user equipment periodically.

In one embodiment, the processor 502 is specifically configured to:

determine a first ratio according to the first interface message, and the first ratio is a ratio of a first number to a second number, the second number is the number of user equipments currently served by any cell, and the first number is the number of user equipments which are currently served by the any cell and of which the current active BWPs are not configured with CSS;

re-determine the special cell of the user equipment in the RRC connected state according to the first ratio.

In one embodiment, the processor 502 is further configured to:

determine a first ratio according to the first interface message, and the first ratio is a ratio of a first number to a second number, the first number is the number of user equipments which are currently served by any cell and of which the current active BWPs are not configured with CSS, and the second number is the number of user equipments currently served by the any cell;

adjust a cell reselection offset between cells according to the first ratio, and send a configuration update message to the DU, so that the DU broadcasts the adjusted cell reselection offset to user equipments in an RRC inactivated state or RRC idle state.

In one embodiment, the processor 502 is configured to:

when it is determined that the first ratio is greater than or equal to a preset threshold, determine an adjustment value of the cell reselection offset according to the first ratio; and the greater the first ratio is, the greater the adjustment value is;

adjust the cell reselection offset according to the adjustment value.

In FIG. 5, the bus architecture may include any numbers of interconnected buses and bridges, and specifically link various circuits of one or more processors represented by the processor 502 and the memory represented by the memory 501. The bus architecture may further link various other circuits such as peripheral device, voltage regulator and power management circuit, which are all well known in the art and thus will not be further described again herein. The bus interface provides an interface. The transceiver 503 may be a plurality of elements, i.e., include a transmitter and a receiver, and provide the devices for communicating with various other devices over the transmission media. The processor 502 is responsible for managing the bus architecture and general processing, and the memory 501 may store the data used by the processor 502 when performing the operations.

In one embodiment, the memory 501 may include a Read Only Memory (ROM), a Random Access Memory (RAM), and a magnetic disk memory. The memory 501 is used to store the data required by the processor 502 when running, that is, store the instructions that can be executed by at least one processor 502. The at least one processor 502 performs the configuration information transmission method provided by the embodiments shown in FIGS. 1-4 by executing the instructions stored in the memory 501. Here, the number of memories 501 is one or more. Here, the memory 501 is shown together in FIG. 5, but it should be known that the memory 501 is not a mandatory functional module, so it is shown by broken lines in FIG. 5.

Figure 6:
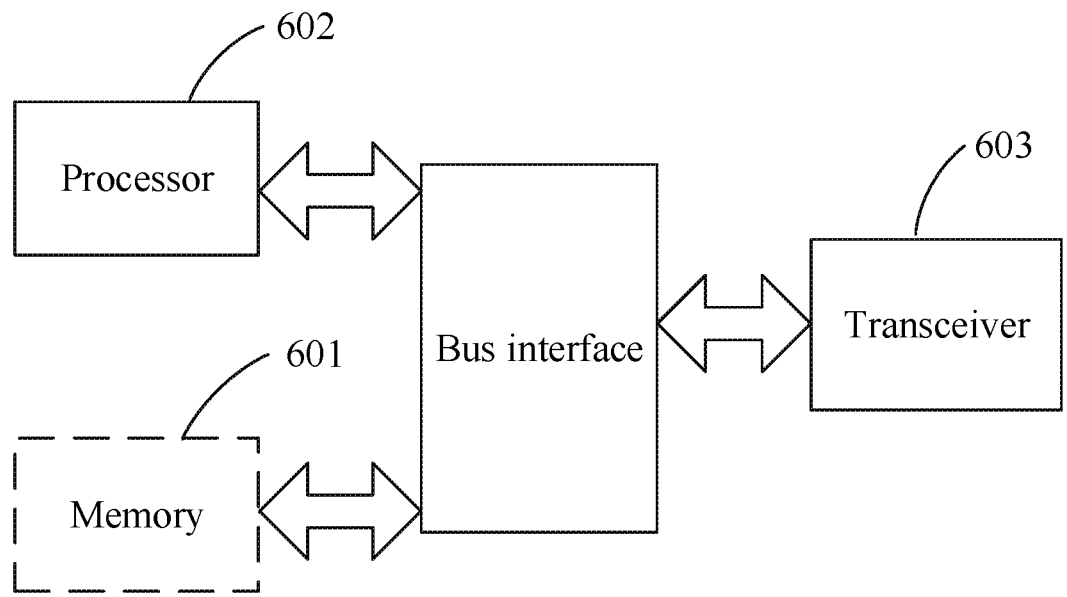
FIG. 6 is a schematic structural diagram of a DU entity according to an embodiment of the application.

Referring to FIG. 6, based on the same inventive concept, an embodiment of the application provides a DU entity in a wireless access network, including: a memory 601, a processor 602 and a transceiver 603, and the memory 601 and the transceiver 603 may be connected to the processor 602 through a bus interface (taking this as an example in FIG. 6), or may be connected to the processor 602 through special connection lines.

The memory 601 may be configured to store programs. The transceiver is configured to receive and send data under the control of the processor. The processor 602 may be configured to read the programs in the memory 601 to perform the process of:

generating a first interface message, and the first interface message carries indication information, the indication information is used to indicate at least one user equipment, and a current active BWP of the at least one user equipment is not configured with a CSS;

sending the first interface message to a CU in the RAN via the transceiver 603.

In one embodiment, the processor 602 is further configured to: generate updated system information; or, receive a second interface message from the CU via the transceiver 603, and the second interface message carries updated system information.

In one embodiment, the transceiver 603 is further configured to:

receive a third interface message from the CU, and the third interface message carries second indication information;

and the second indication information is used to instruct the DU to report the at least one user equipment, or the second indication information carries a period value and is used to instruct the DU to report the at least one user equipment periodically.

In FIG. 6, the bus architecture may include any numbers of interconnected buses and bridges, and specifically link various circuits of one or more processors represented by the processor 602 and the memory represented by the memory 601. The bus architecture may further link various other circuits such as peripheral device, voltage regulator and power management circuit, which are all well known in the art and thus will not be further described again herein. The bus interface provides an interface. The transceiver 603 may be a plurality of elements, i.e., include a transmitter and a receiver, and provide the devices for communicating with various other devices over the transmission media. The processor 602 is responsible for managing the bus architecture and general processing, and the memory 601 may store the data used by the processor 602 when performing the operations.

In one embodiment, the memory 601 may include a Read Only Memory (ROM), a Random Access Memory (RAM), and a magnetic disk memory. The memory 601 is used to store the data required by the processor 602 when running, that is, store the instructions that can be executed by at least one processor 602. The at least one processor 602 performs the configuration information transmission method provided by the embodiments shown in FIGS. 1-4 by executing the instructions stored in the memory 601. Here, the number of memories 601 is one or more. Here, the memory 601 is shown together in FIG. 6, but it should be known that the memory 601 is not a mandatory functional module, so it is shown by broken lines in FIG. 6.

Figure 7:
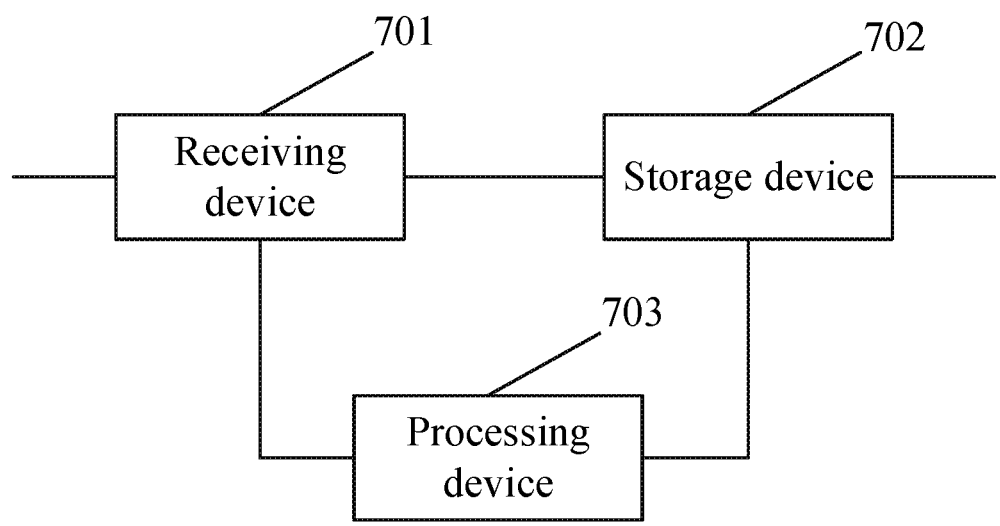
FIG. 7 is another schematic structural diagram of a CU entity according to an embodiment of the application.

Referring to FIG. 7, based on the same inventive concept, an embodiment of the application provides a CU entity in a wireless access network, including: a receiving device 701 and a storage device 702. The receiving device 701 may be configured to receive a first interface message from a DU in the RAN, and the first interface message carries first indication information, the first indication information is used to indicate at least one user equipment, and a current active BWP of the at least one user equipment is not configured with a CSS. The storage device 702 may be configured to store the first interface message.

In one embodiment, the first interface message carries updated system information; or, the first interface message is a feedback message of a second interface message, and the second interface message carries updated system information and is used to inform the DU that system information has been updated.

In one embodiment, the CU entity further includes:

a processing device 703 configured to generate a reconfiguration message for the at least one user equipment, and the reconfiguration message carries the updated system information;

a sending device configured to send a downlink RRC transmission message to the DU to send the reconfiguration message to the at least one user equipment through the DU, and the downlink RRC transmission message carries the reconfiguration message.

In one embodiment, the processing device 703 is further configured to: re-determine a special cell of a user equipment in an RRC connected state according to the first interface message; the sending device is further configured to: send a reconfiguration message to the user equipment, and the reconfiguration message is used to instruct the user equipment to perform handover to change the special cell.

In one embodiment, the sending device is further configured to: send a third interface message to the DU, and the third interface message carries second indication information; and the second indication information is used to instruct the DU to report the at least one user equipment, or the second indication information carries a period value and is used to instruct the DU to report the at least one user equipment periodically.

In one embodiment, the processing device 703 is configured to:

determine a first ratio according to the first interface message, and the first ratio is a ratio of a first number to a second number, the second number is the number of user equipments currently served by any cell, and the first number is the number of user equipments which are currently served by the any cell and of which the current active BWPs are not configured with CSS;

re-determine the special cell of the user equipment in the RRC connected state according to the first ratio.

In one embodiment, the processing device 703 is configured to:

determine a first ratio according to the first interface message, and the first ratio is a ratio of a first number to a second number, the first number is the number of user equipments which are currently served by any cell and of which the current active BWPs are not configured with CSS, and the second number is the number of user equipments currently served by the any cell;

adjust a cell reselection offset between cells according to the first ratio, and send a configuration update message to the DU, so that the DU broadcasts the adjusted cell reselection offset to user equipments in an RRC inactivated state or RRC idle state.

In one embodiment, the processing device 703 is specifically configured to:

when it is determined that the first ratio is greater than or equal to a preset threshold, determine an adjustment value of the cell reselection offset according to the first ratio; and the greater the first ratio is, the greater the adjustment value is;

adjust the cell reselection offset according to the adjustment value.

The physical devices corresponding to the receiving device 701, the storage device 702 and the processing device 703 may all be the aforementioned processor 502 or transceiver 503. The CU entity may be used to perform the configuration information transmission method provided by the embodiments shown in FIGS. 1-4. Therefore, for the functions that can be implemented by the functional modules in the device, the reference may be made to the corresponding description in the embodiments shown in FIGS. 1-4, which will not be repeated.

Figure 8:
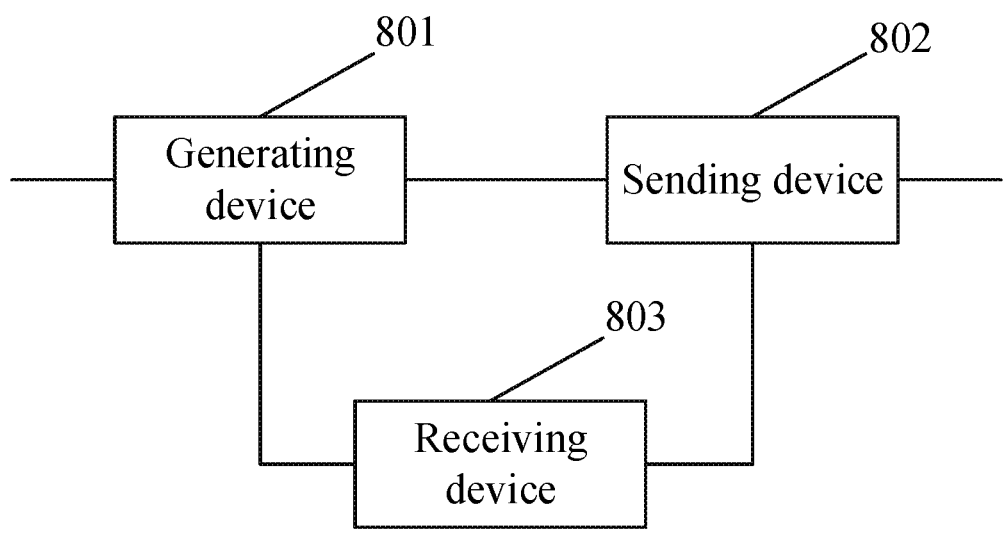
FIG. 8 is another schematic structural diagram of a DU entity according to an embodiment of the application.

Referring to FIG. 8, based on the same inventive concept, an embodiment of the application provides a DU entity in a wireless access network, including: a generating device 801 and a sending device 802. The generating device 801 may be configured to generate a first interface message, and the first interface message carries indication information, the indication information is used to indicate at least one user equipment, and a current active BWP of the at least one user equipment is not configured with a CSS; The sending device 802 may be configured to send the first interface message to a CU in the RAN.

In one embodiment, the DU entity further includes a receiving device 803, and:

the generating device 801 is further configured to: generate updated system information;

or, the receiving device 803 is configured to: receive a second interface message from the CU, and the second interface message carries updated system information.

In one embodiment, the receiving device 803 is further configured to:

receive a third interface message from the CU, and the third interface message carries second indication information;

and the second indication information is used to instruct the DU to report the at least one user equipment, or the second indication information carries a period value and is used to instruct the DU to report the at least one user equipment periodically.

The physical devices corresponding to the generating device 801, the sending device 802 and the receiving device 803 may all be the aforementioned processor 602 or transceiver 603. The CU entity may be used to perform the configuration information transmission method provided by the embodiments shown in FIGS. 1-4. Therefore, for the functions that can be implemented by the functional modules in the device, the reference may be made to the corresponding description in the embodiments shown in FIGS. 1-4, which will not be repeated.

In one embodiment, the processor 502 or processor 602 may specifically be a central processor, an Application Specific Integrated Circuit (ASIC), or may be one or more integrated circuits for controlling the program execution.

Based on the same inventive concept, an embodiment of the application further provides a computer storage medium, and the computer storage medium stores computer instructions. When the computer instructions run on a computer, the configuration information transmission method according to the embodiments shown in FIGS. 1-4 is performed.

In some possible embodiments, various aspects of the configuration information transmission method, CU entity and DU entity according to the application can also be implemented in the form of a program product, which includes program codes. When the program product runs on a computer device, the program codes are configured to cause the computer device to perform the steps in the method for selecting the configuration information according to various exemplary embodiments of the application described above in this specification, for example, the computer device may perform the configuration information transmission method provided by the embodiments as shown in FIGS. 1-4.

The program product can use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

The program product for the AMF selection method of the embodiment of the present application may adopt a portable Compact Disk-Read Only Memory (CD-ROM) and include program codes, and may be run on a computing device. However, the program product of the present application is not limited to this. In this document, the readable storage medium can be any tangible medium that contains or stores a program, where the program can be used by or used in combination with the instruction execution system, apparatus or device.

The readable signal medium may include data signals propagated in the baseband or as a part of carrier waves, and the readable program codes are stored therein. Such propagated data signals can be in many forms, including but not limited to electromagnetic signals, optical signals, or any suitable combination thereof. The readable signal medium may also be any readable medium other than the readable storage medium, and the readable medium may send, propagate or transmit the programs used by or used in combination with the instruction execution system, apparatus or device.

The program codes contained on the readable medium can be transmitted by any suitable medium, including but not limited to wireless, wired, optical cable, RF, etc., or any suitable combination thereof.

The program codes for performing the operations of the present application can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device (for example, using the Internet service provider to connect via the Internet).

It should be noted that several devices or subdevices of the apparatuses are mentioned in the above detailed description, but such division is only exemplary and not mandatory. In fact, according to the embodiments of the present application, the features and functions of two or more devices described above may be embodied in one device. Conversely, the features and functions of one device described above may be further divided into multiple devices to be embodied.

In addition, although the operations of the method of the application are described in a specific order in the drawings, this does not require or imply that these operations must be performed in the specific order or that all the operations shown must be performed to achieve the desired result. Additionally or alternatively, some steps may be omitted, multiple steps may be combined into one step for execution, and/or one step may be decomposed into multiple steps for execution.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A configuration information transmission method, comprising:
receiving, by a Central Unit, CU, in a Radio Access Network, RAN, a first interface message from a Distributed Unit, DU, in the RAN;
wherein the first interface message carries first indication information, the first indication information is used to indicate at least one user equipment, and a current active Band Width Part, BWP, of the at least one user equipment is not configured with a Common Search Space, CSS.

2. The method of claim 1, wherein:
the first interface message carries updated system information;
or
the first interface message is a feedback message of a second interface message, wherein the second interface message carries updated system information and is used to inform the DU that system information has been updated.

3. The method of claim 2, wherein after the CU in the RAN receives the first interface message from the DU in the RAN, the method further comprises:
generating, by the CU, a reconfiguration message for the at least one user equipment, wherein the reconfiguration message carries the updated system information;
sending, by the CU, a downlink Radio Resource Control, RRC, transmission message to the DU to send the reconfiguration message to the at least one user equipment through the DU, wherein the downlink RRC transmission message carries the reconfiguration message.

4. The method of claim 1, further comprising:
re-determining, by the CU, a special cell of a user equipment in an RRC connected state according to the first interface message;
sending, by the CU, a reconfiguration message to the user equipment, wherein the reconfiguration message is used to instruct the user equipment to perform handover to change the special cell.

5. The method of claim 1, wherein before the CU in the RAN receives the first interface message from the DU in the RAN, the method further comprises:
sending, by the CU, a third interface message to the DU, wherein the third interface message carries second indication information;
wherein the second indication information is used to instruct the DU to report the at least one user equipment, or the second indication information carries a period value and is used to instruct the DU to report the at least one user equipment periodically.

6. The method of claim 4, wherein re-determining, by the CU, the special cell of the user equipment in the RRC connected state according to the first interface message, comprises:
determining, by the CU, a first ratio according to the first interface message, wherein the first ratio is a ratio of a first number to a second number, the first number is the number of user equipments which are currently served by any cell and of which current active BWPs are not configured with CSS, and the second number is the number of user equipment devices currently served by the any cell;
re-determining, by the CU, the special cell of the user equipment in the RRC connected state according to the first ratio.

7. The method of claim 1, further comprising:
determining, by the CU, a first ratio according to the first interface message, wherein the first ratio is a ratio of a first number to a second number, the first number is the number of user equipments which are currently served by any cell and of which current active BWPs are not configured with CSS, and the second number is the number of user equipments currently served by the any cell;

adjusting, by the CU, a cell reselection offset between cells according to the first ratio, and sending a configuration update message to the DU, so that the DU broadcasts the adjusted cell reselection offset to user equipments in an RRC inactivated state or RRC idle state.

8. The method of claim 7, wherein adjusting, by the CU, the cell reselection offset between cells according to the first ratio, comprises:
when the CU determines that the first ratio is greater than or equal to a preset threshold, determining an adjustment value of the cell reselection offset according to the first ratio; wherein the greater the first ratio is, the greater the adjustment value is;
adjusting, by the CU, the cell reselection offset according to the adjustment value.

9. A configuration message transmission method, comprising:
generating, by a Distributed Unit, DU, in a Radio Access Network, RAN, a first interface message, wherein the first interface message carries indication information, the indication information is used to indicate at least one user equipment, and a current active Band Width Part, BWP, of the at least one user equipment is not configured with a Common Search Space, CSS;
sending, by the DU, the first interface message to a Central Unit, CU, in the RAN.

10. The method of claim 9, wherein before the DU in the RAN generates the first interface message, the method further comprises:
generating, by the DU, updated system information;
or,
receiving, by the DU, a second interface message from the CU, wherein the second interface message carries updated system information and is used to inform the DU that system information has been updated.

11. The method of claim 9, further comprising:
receiving, by the DU, a third interface message from the CU, wherein the third interface message carries second indication information;
wherein the second indication information is used to instruct the DU to report the at least one user equipment device, or the second indication information carries a period value and is used to instruct the DU to report the at least one user equipment device periodically.

12. A Central Unit, CU, entity in a radio access network, comprising:
a memory configured to store instructions; a processor configured to read the instructions in the memory to perform the process of:
receiving a first interface message from a Distributed Unit, DU, in a Radio Access Network, RAN, via a transceiver, wherein the first interface message carries first indication information, the first indication information is used to indicate at least one user equipment, and a current active Band Width Part, BWP, of the at least one user equipment is not configured with a Common Search Space, CSS;
a transceiver configured to receive and send data under control of the processor.

13. The CU entity of claim 12, wherein:
the first interface message carries updated system information;
or
the first interface message is a feedback message of a second interface message, wherein the second interface message carries updated system information and is used to inform the DU that system information has been updated.

14. The CU entity of claim 13, wherein the processor is further configured to:
generate a reconfiguration message for the at least one user equipment, wherein the reconfiguration message carries the updated system information;
send a downlink Radio Resource Control, RRC, transmission message to the DU via the transceiver to send the reconfiguration message to the at least one user equipment through the DU, wherein the downlink RRC transmission message carries the reconfiguration message.

15. The CU entity of claim 12, wherein the processor is further configured to:
re-determine a special cell of a user equipment in an RRC connected state according to the first interface message;
send a reconfiguration message to the user equipment via the transceiver, wherein the reconfiguration message is used to instruct the user equipment to perform handover to change the special cell.

16. A Distributed Unit, DU, entity in a radio access network, comprising:
a memory configured to store instructions;
a processor configured to read the instructions in the memory to perform the method according to claim 9;
a transceiver configured to receive and send data under control of the processor.

17. The DU entity of claim 16, wherein the processor is further configured to:
generate updated system information;
or,
receive a second interface message from the CU via the transceiver, wherein the second interface message carries updated system information and is used to inform the DU that system information has been updated.

18. The DU entity of claim 16, wherein the transceiver is further configured to:
receive a third interface message from the CU, wherein the third interface message carries second indication information;
wherein the second indication information is used to instruct the DU to report the at least one user equipment, or the second indication information carries a period value and is used to instruct the DU to report the at least one user equipment periodically.

19. A non-transitory computer storage medium storing a computer program thereon, wherein the computer program, when executed by a processor, cause the processor to perform the method of claim 1.

20. A non-transitory computer storage medium storing a computer program thereon, wherein the computer program, when executed by a processor, cause the processor to perform the method of claim 9.

* * * * *